United States Patent
Vasshus et al.

(10) Patent No.: US 8,394,270 B2
(45) Date of Patent: Mar. 12, 2013

(54) FLUID TREATMENT AND METHOD AND USE OF SAME

(75) Inventors: Jan Kristian Vasshus, Sandnes (NO); Trond Melhus, Sandnes (NO)

(73) Assignee: Cubility AS, Sandnes (NO)

(*) Notice: Subject to any disclaimer, the term of this patent is extended or adjusted under 35 U.S.C. 154(b) by 605 days.

(21) Appl. No.: 12/297,740

(22) PCT Filed: Apr. 19, 2007

(86) PCT No.: PCT/NO2007/000134
§ 371 (c)(1),
(2), (4) Date: Oct. 28, 2008

(87) PCT Pub. No.: WO2007/123410
PCT Pub. Date: Nov. 1, 2007

(65) Prior Publication Data
US 2009/0107931 A1    Apr. 30, 2009

(30) Foreign Application Priority Data
Apr. 25, 2006 (NO) .................................. 20061830

(51) Int. Cl.
*B01D 35/00* (2006.01)
(52) U.S. Cl. ......... 210/257.1; 55/418; 55/467; 210/188; 210/258; 210/387; 210/400; 210/406; 210/416.1; 210/499
(58) Field of Classification Search .................. 210/808, 210/258, 297, 499, 526, 767, 768, 780, 783, 210/805, 806, 387, 400–404, 406, 416.1, 210/188, 257.1; 55/400, 410, 418, 467
See application file for complete search history.

(56) References Cited

U.S. PATENT DOCUMENTS

| | | | | |
|---|---|---|---|---|
| 2,240,167 A * | 4/1941 | Adams | ............. | 210/254 |
| 4,203,836 A * | 5/1980 | Hallack et al. | ............. | 210/665 |
| 4,255,269 A * | 3/1981 | Timmer | ............. | 175/66 |
| 4,285,816 A * | 8/1981 | Lee | ............. | 210/401 |
| 4,340,477 A * | 7/1982 | Hobson et al. | ............. | 210/241 |
| 4,571,303 A * | 2/1986 | Ciallella | ............. | 510/299 |
| 4,639,258 A * | 1/1987 | Schellstede et al. | ............. | 95/260 |

(Continued)

FOREIGN PATENT DOCUMENTS

| | | |
|---|---|---|
| NO | 303323 | 6/1997 |
| NO | 308649 | 10/2000 |

(Continued)

OTHER PUBLICATIONS

PCT Office, "Written Opinion of the International Searching Authority," PCT Office, (Aug. 21, 2007).

(Continued)

*Primary Examiner* — Joseph Drodge
(74) *Attorney, Agent, or Firm* — Gablegotwals

(57) ABSTRACT

A system and method for the treatment of a fluid comprising at least two of the fractions solid particles, liquid and/or gas is described having at least one inlet portion and two or more outlet portions, and being arranged to separate solid particles over a predetermined size from the liquid by at least one screening apparatus and then carrying the fractions out of the system. The system (1) being substantially fluid-tight between the at least one inlet and outlet inlet portions and being provided with at least one underpressure-generating device arranged to provide an underpressure in the system.

12 Claims, 4 Drawing Sheets

U.S. PATENT DOCUMENTS

| | | | |
|---|---|---|---|
| 4,750,920 A * | 6/1988 | Manuel et al. | 95/260 |
| 5,041,222 A * | 8/1991 | O'Dell | 210/386 |
| 5,074,477 A | 12/1991 | Welter et al. | |
| 5,160,443 A * | 11/1992 | Mesheau | 210/799 |
| 5,494,584 A * | 2/1996 | McLachlan et al. | 210/739 |
| 5,582,727 A * | 12/1996 | Foster | 210/258 |
| 5,624,579 A * | 4/1997 | Bratten | 210/783 |
| 5,897,775 A * | 4/1999 | Kihlstrom | 210/406 |
| 6,110,367 A * | 8/2000 | Jensen et al. | 210/297 |
| 6,179,070 B1 * | 1/2001 | Dietzen | 175/66 |
| 6,345,672 B1 * | 2/2002 | Dietzen | 175/66 |
| 6,358,406 B1 * | 3/2002 | Hirs | 210/90 |
| 6,475,377 B1 * | 11/2002 | Fox et al. | 210/90 |

FOREIGN PATENT DOCUMENTS

| | | |
|---|---|---|
| NO | 319329 | 7/2005 |
| NO | 323519 | 4/2007 |
| WO | WO 2006/098638 | 9/2006 |
| WO | WO 2007/004889 | 1/2007 |

OTHER PUBLICATIONS

PCT Office, "Written Opinion of the International Preliminary Examining Authority," PCT Office, (Mar. 25, 2008).

PCT Office, "Notification of Transmittal of International Preliminary Report on Patentability," PCT Office, (Jun. 27, 2008).

* cited by examiner

FLUID TREATMENT AND METHOD AND USE OF SAME

CROSS-REFERENCE TO PENDING APPLICATIONS

This application is based on PCT Patent Application No. NO2007/000134, filed on Apr. 19, 2007, which was based on Norwegian Patent Application No. 20061830, filed on Apr. 25, 2006.

The present invention relates to a fluid treatment system. More particularly, it relates to a system for the separation of the solid particles of a fluid over a predetermined size from the liquid of the fluid and possible gas which is liberated from the fluid. The fluid may be, for example, but not limited to, a drilling fluid containing drilling mud and drilled particles, so-called cuttings, and also liquid and gas.

The separation of solid particles from fluid flows, carried out by passing a fluid through a filter or screen device with perforations of such a size that the solid particles are retained on the screen surface instead of passing through it, is a well-known technique. This is known from, among other things, well drilling in the petroleum production industry, in which so-called shale shaker apparatuses or "shakers" are used to separate cuttings from the drilling fluid, so that valuable drilling liquid can be recirculated down the well. However, in the treatment of fluid, as by screening for example, evaporation of gases unfavourable to health and environment could occur, which could additionally represent a safety risk. No known solutions have been found which could in a practical way encase a shale shaker apparatus without the whole apparatus being built into a separate room. However, this does not solve the problem of personnel, operating and maintaining the equipment during operation, being exposed to said gases. Thus, protective equipment will have to be used even if a shale shaker apparatus is built in in accordance with the prior art.

In Norwegian patent application NO20053230, whose inventors are the same as those of the present invention, is described a screening and fluid separation apparatus solving said problem of gas evaporation from a screening apparatus among other things. Norwegian patent application NO20053230 is incorporated in the present disclosure by reference in its entirety. However, the invention according to NO20053230 will only lead away the gasses that are liberated in the screening apparatus itself. Thus, gases that are liberated from the fluid at other points in the process with open zones could not be collected and led away in a controlled manner. In the offshore industry, among others, but also in other industries in which fluid cleaning is relevant, like for example in the spreading of manure in agriculture, there is an express wish for being able to protect personnel and environment from health-injurious gases which could be emitted from fluid under treatment. So far, this whish has not been possible to fulfil without the use of protective equipment.

The invention has for its object to remedy or reduce at least one of the drawbacks of the prior art.

The object is achieved through features which are indicated in the description below and in the claims that follow.

In a first aspect the present invention is constituted by a system for the treatment of a fluid comprising at least two of the fluid fractions solid particles, liquid and/or gas, the system being defined by at least one inlet portion and two or more outlet portions, and the system being arranged to separate solid particles over a predetermined size from the liquid by means of at least one screening apparatus and then carry the separated solid particles, liquid and at least a portion of said gas, out of the system, the system for treating fluid being substantially fluid-tight between said at least one inlet portion and outlet portions, and being provided with at least one underpressure-generating device which is arranged to provide an underpressure in the system between said at least one inlet portion and the outlet portions, the screening apparatus being arranged to separate the fluid into fractions substantially including solids, liquid and/or gas, the fractions of the fluid being kept separate as the fractions are brought out of the system.

It will be understood that the liquid may contain particles which are smaller than said predetermined size, so that they can pass through the screening device.

It is an advantage if the screening apparatus is of the kind which is disclosed in Norwegian patent application NO 20053230, that is to say the screening apparatus preferably includes an endless rotating screening element, a suction device, which is in fluid communication with the underpressure-generating device, being arranged towards a portion of the underside of the screening element. To collect the separated particles and the liquid for further processing outside the system, it is an advantage if the system is provided with at least one container which is arranged to maintain the separation between solids and liquid. In a preferred embodiment the system is provided with at least two containers, one for solids and one for liquid. Said at least one, but preferably at least two containers could function both as a storage unit and as a buffer tank before the fluid fractions solids and liquid are passed on for further treatment, either into said preferably two containers or by the fractions being transferred into other suitable transport devices. Preferably, while in the system, the containers are connected to the underpressure of the system.

In a preferred embodiment the underpressure-generating device is arranged in such a way that a fluid flow of, for example but not limited to, air is generated, which could move the fluid through at least portions of the system for treating fluid. The underpressure-generating device preferably includes a vacuum pump known per se.

In a second aspect of the present invention there is provided a method of separating a fluid including at least two of the fractions solid particles, liquid and/or gas, in a system which is provided with at least one inlet portion and two or more outlet portions, the system being arranged to separate solid particles over a predetermined size from the liquid by means of at least one screening apparatus and subsequently carry the particles separated from the fluid, liquid and at least a portion of said gas out of the system, the method for treating the fluid comprising the following steps: arranging a substantially fluid-tight system between said at least one inlet portion and the outlet portions; providing an underpressure between said at least one inlet portion and the outlet portions by means of at least one underpressure-generating device; leading the fluid in through said at least one inlet portion, through the at least one screening apparatus, in which the fluid is separated into fractions essentially including at least two of the fractions solids, liquid and/or gas; and maintaining the separation of the fractions of the fluid out of the system through respective outlet portions.

In what follows is described a non-limiting example of a preferred embodiment which is visualized in the accompanying drawings, in which like or corresponding parts are indicated substantially by the same reference numerals, and in which.

Figure 1:
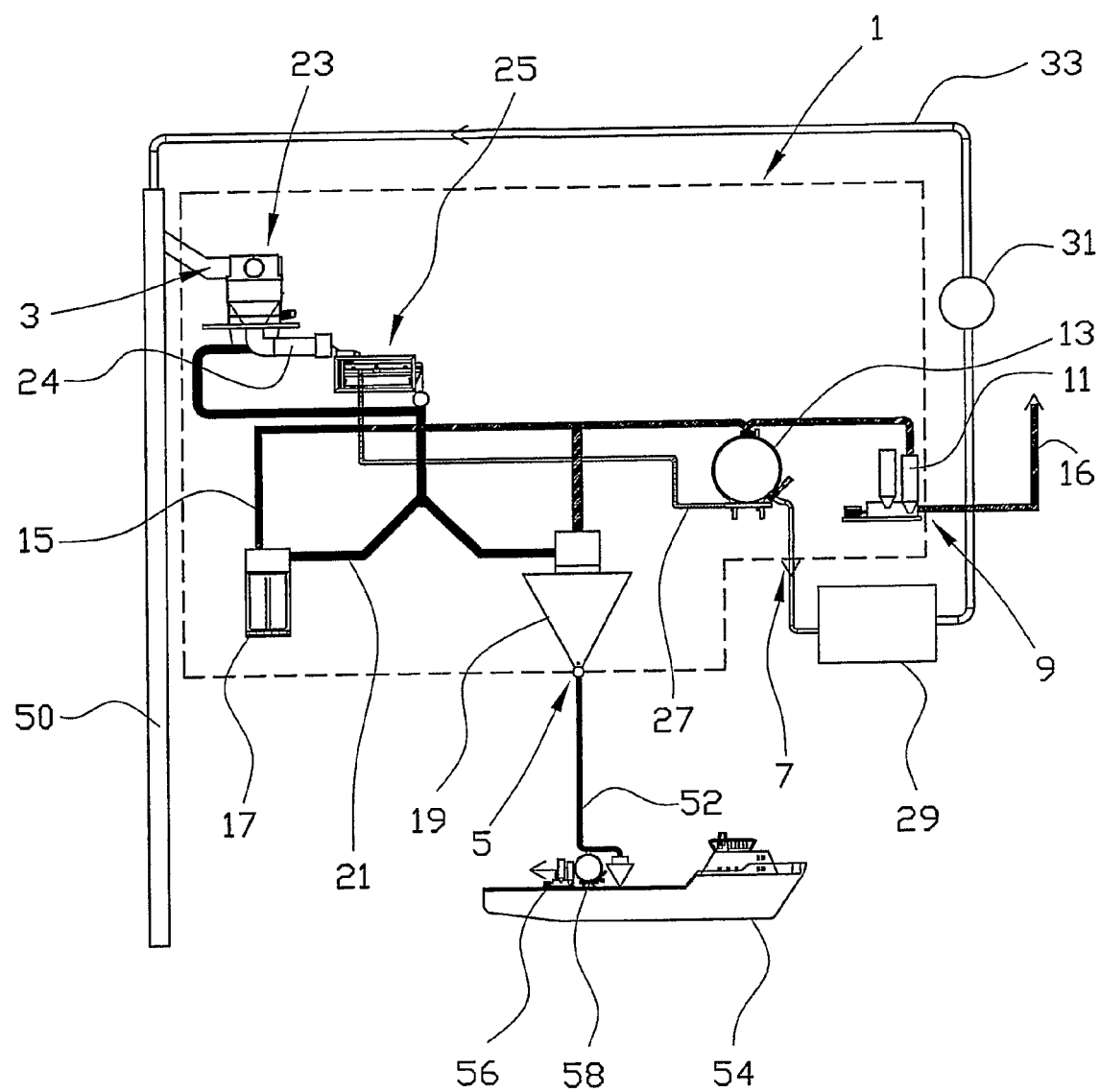
FIG. 1 shows a principle drawing of a fluid treatment system for drilling fluid according to the present invention.

In the figures the reference numeral 1 indicates a fluid treatment system for the separation of the solids, liquid and gas fractions of a fluid. The fluid treatment system 1 will be referred to, in what follows, as the system 1.

In FIG. 1 is shown a principle drawing of a system 1 for treating a drilling fluid in the petroleum industry, the system 1, covered by this patent application, being shown as defined by means of a dashed line. A skilled person will immediately understand that the individual elements which are shown in the principle drawing are not to scale.

The system 1 includes an inlet portion 3 and three outlet portions 5, 7 and 9 for separated solids, liquid and gas, respectively.

The inlet portion 3 is connected to the so-called mud return nipple or "bell nipple" on a riser 50.

An underpressure-generating device in the form of a vacuum pump 11 and an associated vacuum tank 13 is connected to a pipe system 15 connecting the vacuum tank 13 to the interior of two containers 17, 19; respectively, a transport container 17 which is arranged to be disconnected and transported out of the system 1, and an intermediate storage container 19 which is arranged to be connected to a conveying system 52. The conveying system 52 is constituted by a pipe system for closed transfer of the contents of the container 19 to a ship 54. In the exemplary embodiment the ship 54 is shown to be provided with a suction device in the form of a vacuum pump 56 with an associated vacuum tank 58 for sucking the contents of the intermediate storage container 19 aboard the ship 54. However, it will be understood that other devices known per se for the transfer from the intermediate storage container 19 into the ship 54 could be used.

To either one of the containers 17, 19 is connected a further pipe 21. The pipe 21 is arranged to lead solid particles which have been separated from the drilling fluid to a first screening device 23 and a second screening device 25. For simplicity, the pipe 21 is referred to, in what follows, as the "solids line" 21. The first screening device 23 is arranged, among other things, to separate coarse particles carried in the drilling fluid, and will, for simplicity, be referred to, in what follows, as the "coarse separator 23". The coarse separator 23 is described in further detail when reference is made to FIG. 2.

The second screening device 25 is a screening device of the kind which is covered by Norwegian patent application NO20053230 and which includes an endless, rotating screening element or screen cloth, in which a suction device, which is in fluid communication with the underpressure-generating device 11, 13, is arranged towards a portion of the underside of the screening element. The second screening device 25 is arranged to separate return liquid from the solid particles of the drilling fluid which are retained on said rotating screen cloth. In what follows, the second screening device is called a "fine screen" 25 and is described in some more detail with reference to FIG. 3.

The coarse separator 23 is connected to and in fluid communication with the fine screen 25 via a flow line 24, so that the portion of the drilling fluid passing a screen 237 of the coarse separator 23 is carried to an inlet portion 251 of the fine screen 25.

The distribution of solid particles which are carried from the coarse separator 23 and fine screen 25 via the solids line 21 to the transport container 17 and intermediate storage container 19 is controlled by means of a distributing device, not shown.

The return liquid which is separated in the fine screen 25 from the drilling fluid by means of at least a suction device 257' is carried by the underpressure into the vacuum tank 13 via a line 27. In what follows, the line 27 is called the "return liquid line" 27. From the vacuum tank 13 the return liquid separated from the drilling fluid is pumped in a controlled manner and by means of pump devices (not shown) known per se out of the system 1 into a container 29 for active drilling liquid. By means of a high-pressure drilling liquid pump 31 the active drilling liquid is pumped in a manner known per se from the container 29 into the well via an injection line 33.

The gas which is liberated from the fluid is pumped, together with air which is drawn into the system 1 at the coarse separator 23, by means of the underpressure-generating device 11, 13 via a breather line 16 into the open air. It will be understood that the gas could, alternatively, be collected in a suitable container (not shown) for further treatment, possibly cleaned before vented to the atmosphere.

Figure 2:
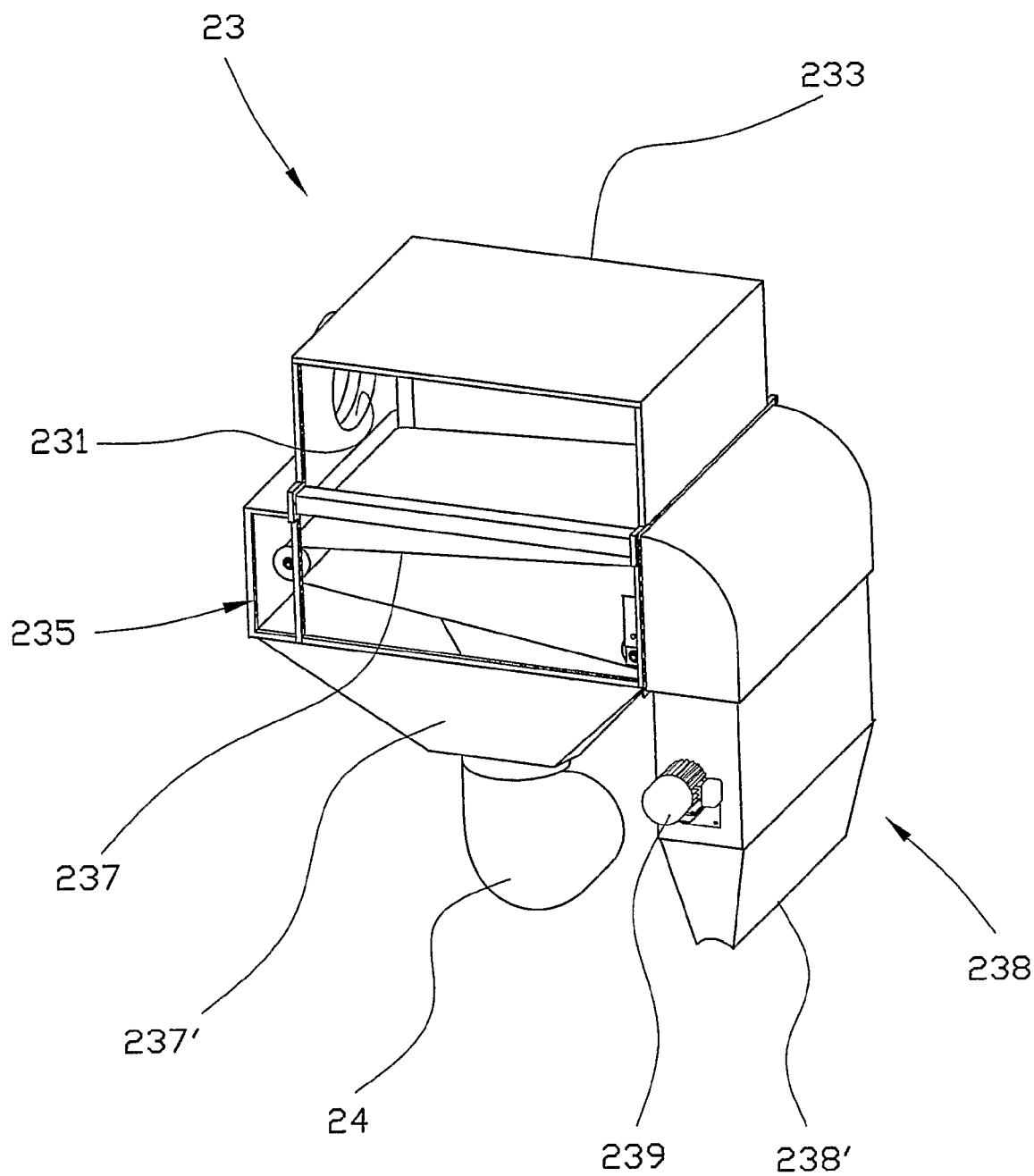
FIG. 2 shows, on a larger scale, a perspective view of a first screening apparatus included in the system shown in FIG. 1.

In FIG. 2 is shown a perspective view of the coarse separator 23 shown in principle in FIG. 1, but on a larger scale and in further detail. For clarity, portions of the coarse separator 23 are shown transparent. However, it will be understood that the coarse separator 23 is encased. Drilling fluid is carried from the mud return nipple of the riser 50 in through an inlet 231 which is placed in a housing 233. The housing 233 is fixedly disposed on a screening device 235 which includes an endless screen cloth 237 which is suspended between and arranged to rotate about three deflection rollers (only one shown).

Drilling mud which is led into the coarse separator 23 is separated by coarse particles which do not pass the screen cloth 237 being conveyed thereon and falling into a comminutor 238 for coarse particles or coarse cuttings. The comminutor 238 is driven by a motor 239. In the comminutor 238 the cuttings are crushed into smaller fractions. From the comminutor 238 the cuttings are carried in a closed system from a comminutor outlet portion 238' into the solids line 21 and via the distribution station, not shown, further into the transport container 17 and/or intermediate storage container 19.

The portion of the drilling mud passing the screen cloth 237 is carried via a screen outlet portion 237' into the flow line 24 and further into an inlet portion 251 (see FIG. 3) of the fine screen 25.

The coarse separator 25 is at an internal underpressure which is influenced by the underpressure-generating device 11, 13 and a control valve, not shown, for the supply of air. Said control valve is placed in a portion of the coarse separator 25. The air flow which is generated by means of said control valve and underpressure-generating device 11, 13 will effect transfer of the drilling mud. In addition, the air flow could act as a coolant for the drilling mud, which could, in turn, contribute to reduced evaporation of toxic fractions.

Figure 3:
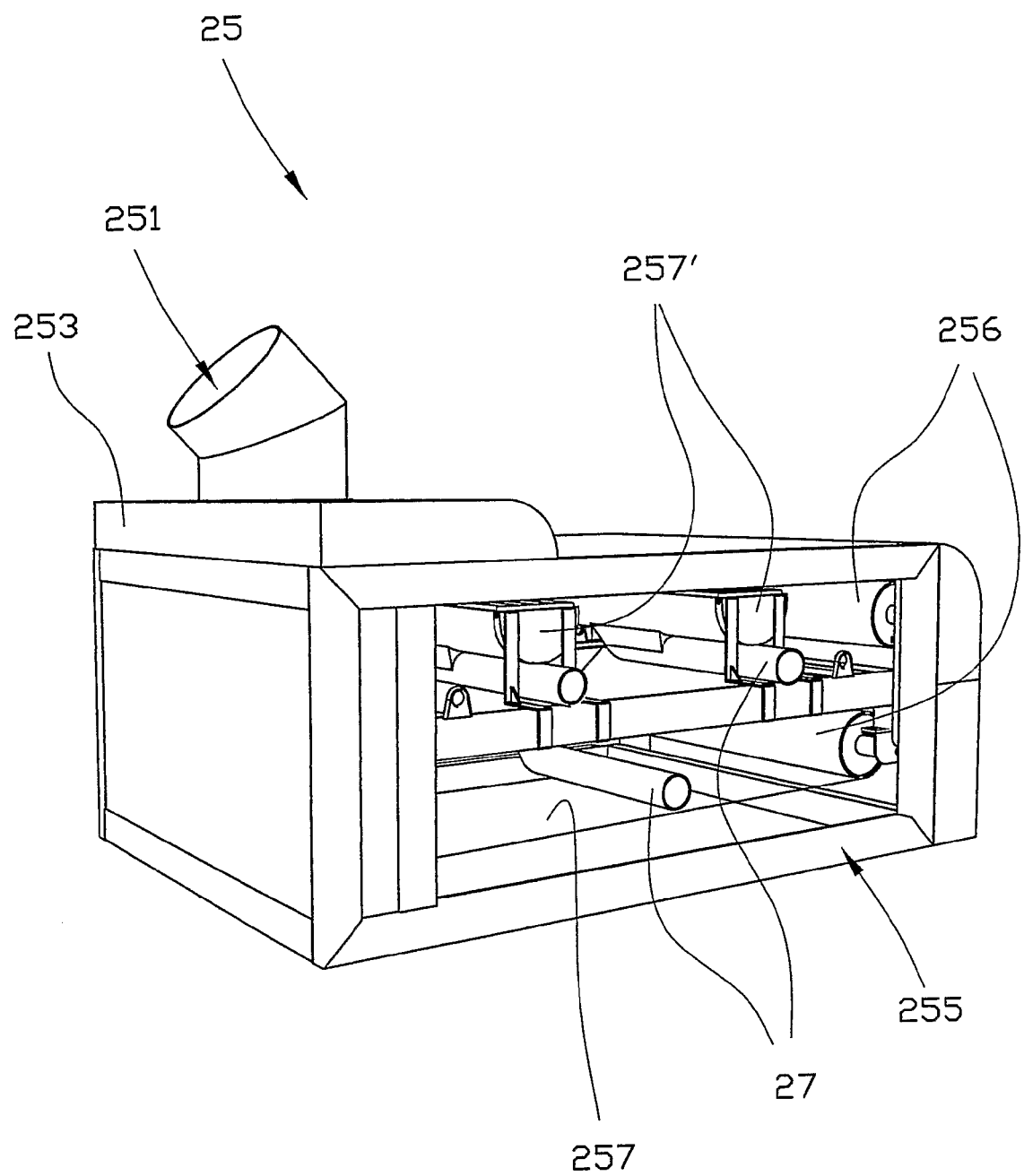
FIG. 3 shows, on a larger scale, a perspective view of a second screening apparatus included in the system shown in FIG. 1.

In FIG. 3 is shown a perspective view of the fine screen 25 shown in principle in FIG. 1, but on a larger scale and in more detail. For clarity, the fine screen 25 is shown partly transparent. However, it is to be understood that the fine screen 25 is encased. A detailed description of the fine screen 25 can be found in Norwegian patent application NO20053230. Drilling mud passing the screen cloth 237 in the coarse separator 23 mentioned above is carried via a flow line 24 into an inlet portion 251 which is placed in a housing 253. The housing 253 is fixedly disposed on a screening device 255 which includes an endless screen cloth 257 which is suspended between and arranged to rotate about four deflection rollers 256 (two shown).

Under a portion of the screen cloth 257 are placed two spaced-apart suction nozzles 257'. The suction nozzles 257' are in fluid communication with the underpressure-generating device 11, 13. The suction nozzle 257' sucks liquid, and also particles passing through the openings of the screen cloth 257, bringing it via the return liquid line 27 into the vacuum tank 13 as described above.

In one embodiment (not shown) the fine screen 25 is further provided with an acoustic sound source, for example an ultrasonic source, still further effecting separation of liquid from the solid matter. Such an acoustic sound source is described in detail in Norwegian patent application NO20051433, whose inventors are the same as those of the present invention, which is incorporated in the present disclosure by reference in its entirety.

Figure 4:
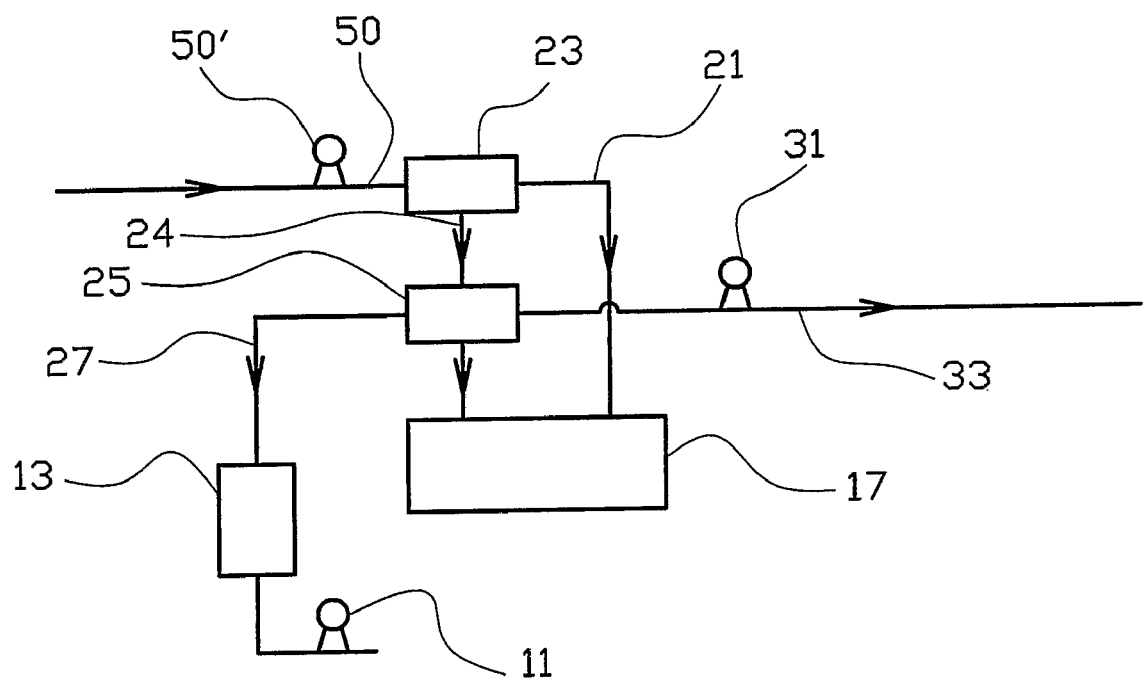
FIG. 4 shows a principle drawing of a fluid treatment system for cleaning bottom sediments in a sea.

In FIG. 4 is shown a flow chart of a fluid treatment system according to the present invention used in treating a fluid which is sucked up from the bottom of a sea, for example a basin. Thus, the process substantially corresponds to the process in which drilling fluid is separated into the fractions solids, drilling liquid and gas as shown in FIG. 1 and described above, but in which the fluid treatment system has only two outlets, one through the return line 33 and one (not shown) through the transport or intermediate storage container 17, 19. Fluid which is to be cleaned is pumped into the system by means of a pump 50'.

The present invention could also be very useful in cleaning contaminated mass on land, for example oil-contaminated sand. To the contaminated mass chemicals could then be added, facilitating the dissolving of the contamination, whereby the constituents of the fluid, such as solids (sand), liquid (chemicals and oil) and gas (from chemicals and oil) can be collected in a controlled manner and possibly be subjected to further treatment.

An example of another field of use of the present invention is the separation of manure, in which this may be separated into the fractions solid matter, liquid and gas. The solid matter could be used as biomass for the production of biogas or for the production of pellets for soil improvement. The liquid, possibly together with the gas, will be well suited for injection into the ground, which has turned out to be an efficient form of fertilization.

An underpressure system on which the present invention is based could result, in terms of design, in equipment with fewer safety factors and thereby smaller/lighter equipment than corresponding equipment designed for pressure, as the consequences of a possible collapse in an underpressure system are smaller than those of a corresponding collapse in pressure-loaded equipment.

Thus, the present invention represents a way of treating a fluid, in which there is full control of the fractions of the fluid, which represents very big advantages relative to the prior art with respect to both health and environmental aspects during the cleaning process itself. In addition, the invention opens to new possibilities for cleaning fluid containing solids, liquid and possible gas.

The invention claimed is:

1. A system for separating from a fluid a solid particle fraction and at least one fraction selectable from liquid and gas, the system comprising:
a fluid inlet;
a screening device in communication with the fluid inlet;
a piping arrangement with a plurality of pipes for conveying said fractions from said screening device,
a plurality of outlets in communication with the piping arrangement, the at least two fractions being directed towards a respective one of said outlets,
an under-pressure generating device comprising a vacuum tank and is suction device enabling creation of an under-pressure within the system, and thereby enabling inflow of air into the system from outside the system;
at least one container arranged for receiving through an upstream end thereof the solid particles from a respective one of the pipes, said at least one container being in communication with the under-pressure generating device to create an under-pressure within the at least one container; and
a vacuum tank of the under-pressure-generating device linked to the piping arrangement and to said screening device and configured to thereby cause movement of liquid fractions of the fluid from the inlet and the screening device to the vacuum tank, wherein the under-pressure generating tank is fluidly connected to at least the screening device and the at least one container.

2. The system according to claim 1, wherein the at least one of said separating or screening device has a fine particles separating section thereof comprising an endless, rotary screening element, and wherein a liquid suction device faces a portion of an underside of the screening element, the suction device being operated by the under-pressure generating device via a suction pipe.

3. The system according to claim 2, wherein the screening device has a coarse solid particles separating section upstream of said fine solid particles separating section, the coarse solid particles separating section comprising an endless, rotary screening element.

4. The system according to claim 1, further comprising the vacuum tank configured for intermediate storage of the liquid fraction of the fluid.

5. The system according to claim 1, wherein the fluid to enter the fluid inlet comprises a return drilling fluid from a hydrocarbon well.

6. The system according to claim 1, wherein the at least one container comprises at least two containers, and wherein one of the containers at a downstream end is connected to a respective one of said outlets.

7. The system according to claim 1, wherein a fluid input pump is located upstream of the screening device.

8. The system according to claim 1, wherein one of the outlets at the upstream end thereof is linked to a liquid outlet of the vacuum tank, and with its downstream end is connected to an injection line exterior to the system, the injection line having inserted therein a liquid container and a high pressure liquid pump downstream thereof.

9. The system according to claim 1, further wherein a vacuum pump of the under-pressure device is connected to one of said plurality of said outlets, wherein the fractions are separated from the fluid, and wherein the gas fraction of the fluid is caused to exit the system via the vacuum pump and an associated gas and air outlet.

10. The system according to claim 9, wherein said system exit is associated with at least one container for gas venting the gas to the atmosphere.

11. The system according to claim 1, wherein a further one of said containers is arranged for receiving the solid particles at an upstream end thereof from a respective one of the pipes, said at least one container being in communication with the under-pressure generating device to create an under-pressure within the at least one container.

12. The system according to claim 8, wherein a liquid fraction from the liquid container constitutes a return drilling fluid to be pumped by the liquid pump into a hydrocarbon well via the injection line.

* * * * *